US012313856B2

(12) United States Patent
Malchus et al.

(10) Patent No.: US 12,313,856 B2
(45) Date of Patent: May 27, 2025

(54) REAL-TIME MODIFICATION OF LINE FOCUS INTENSITY DISTRIBUTION

(71) Applicant: CORNING INCORPORATED, Corning, NY (US)

(72) Inventors: Reinhard Moritz Malchus, Munich (DE); Tobias Christian Roeder, Munich (DE)

(73) Assignee: Corning Incorporated, Corning, NY (US)

( * ) Notice: Subject to any disclaimer, the term of this patent is extended or adjusted under 35 U.S.C. 154(b) by 261 days.

(21) Appl. No.: 17/708,027

(22) Filed: Mar. 30, 2022

(65) Prior Publication Data

US 2022/0326539 A1 Oct. 13, 2022

Related U.S. Application Data

(60) Provisional application No. 63/172,119, filed on Apr. 8, 2021.

(51) Int. Cl.
*G02B 27/28* (2006.01)
*B23K 26/064* (2014.01)
(Continued)

(52) U.S. Cl.
CPC .......... *G02B 27/286* (2013.01); *B23K 26/064* (2015.10); *B23K 26/38* (2013.01);
(Continued)

(58) Field of Classification Search
CPC .............. B23K 26/046; B23K 26/0604; B23K 26/0624; B23K 26/064; B23K 26/067;
(Continued)

(56) References Cited

U.S. PATENT DOCUMENTS 10,611,668 B2 4/2020 Bookbinder et al.
11,347,068 B2 * 5/2022 Michalowski ..... G02B 27/0927
(Continued)

FOREIGN PATENT DOCUMENTS

CN 106715038 A * 5/2017 ............. B23K 26/03
DE 10105346 A1 * 8/2002 ........... B23K 26/064
(Continued)

OTHER PUBLICATIONS

International Search Report and Written Opinion of the International Searching Authority; PCT/US2022/023233; mailed on Aug. 3, 2022, 12 pages; European Patent Office.

*Primary Examiner* — Steven W Crabb
*Assistant Examiner* — Ket D Dang
(74) *Attorney, Agent, or Firm* — Womble Bond Dickinson (US) LLP

(57) ABSTRACT

Methods, systems, devices, and substrates are described. In some examples, an apparatus may include optical components configured to adjust an input to a laser cutting optic for modifying a substrate (e.g., an optically transmissive substrate). In some examples, the optical components may include a beam deflector, a first optic configured to output a first laser beam with a first beam width, and a second optic configured to output a second laser beam with a second beam width. In some examples, the beam deflector may modify an optical path of a pulsed laser (e.g., through the first optic or through the second optic), which may result in an input to the laser cutting optic having a beam width corresponding to the first optic or the second optic. The different input beam widths may modify a line focus intensity of an output of the laser cutting optic when modifying the substrate.

12 Claims, 7 Drawing Sheets

(51) Int. Cl.
*B23K 26/38* (2014.01)
*C03B 33/02* (2006.01)
*C03C 23/00* (2006.01)
*G02F 1/33* (2006.01)

(52) U.S. Cl.
CPC ...... *C03B 33/0222* (2013.01); *C03C 23/0025* (2013.01); *G02B 27/283* (2013.01); *G02F 1/33* (2013.01)

(58) Field of Classification Search
CPC .. B23K 26/0738; B23K 26/364; B23K 26/38; B23K 26/382; B23K 26/386; C03B 33/0222; C03C 23/0025; G02B 26/0808; G02B 27/283; G02B 27/286; G02F 1/33
USPC .................................................... 219/121.75
See application file for complete search history.

(56) References Cited

U.S. PATENT DOCUMENTS

| | | | | |
|---|---|---|---|---|
| 11,471,977 | B2 * | 10/2022 | Magg | B23K 31/125 |
| 11,648,623 | B2 * | 5/2023 | Gollier | B23K 26/0738 219/121.75 |
| 2005/0098548 | A1 | 5/2005 | Kobayashi et al. | |
| 2005/0279739 | A1 | 12/2005 | Bruland et al. | |
| 2010/0025387 | A1 * | 2/2010 | Arai | B29C 65/1654 219/121.73 |
| 2010/0072183 | A1 * | 3/2010 | Park | C03B 33/0222 219/121.75 |
| 2012/0223061 | A1 * | 9/2012 | Atsumi | B23K 26/53 219/121.72 |
| 2012/0271286 | A1 * | 10/2012 | Curatu | G02B 13/0005 606/4 |
| 2016/0158886 | A1 * | 6/2016 | Kumar | B29D 11/0074 219/121.61 |
| 2017/0189991 | A1 * | 7/2017 | Gollier | G02B 7/10 |
| 2019/0135678 | A1 | 5/2019 | Liu et al. | |
| 2020/0290151 | A1 * | 9/2020 | Matsumoto | B23K 26/0613 |
| 2022/0258523 | A1 * | 8/2022 | Macpherson | B23K 26/40 |

FOREIGN PATENT DOCUMENTS

| | | | | |
|---|---|---|---|---|
| EP | 2944412 A1 * | 11/2015 | ......... | B23K 26/0617 |
| EP | 3708548 A1 * | 9/2020 | ......... | B23K 26/0622 |
| WO | WO-2019107320 A1 * | 6/2019 | ......... | B23K 26/0006 |
| WO | WO-2020257935 A1 * | 12/2020 | ......... | B23K 26/0006 |

* cited by examiner

REAL-TIME MODIFICATION OF LINE FOCUS INTENSITY DISTRIBUTION

This application claims the benefit of priority U.S. Provisional Patent Application Ser. No. 63/172,119 filed on Apr. 8, 2021, the content of which is relied upon and incorporated herein by reference in its entirety.

FIELD OF TECHNOLOGY

The present disclosure relates generally to material modification and more specifically to real-time modification of a line focus intensity distribution.

BACKGROUND

Optically transmissive substrates including, for example, hardened glass materials, may have various industrial and commercial applications, such as laptop computers, wearable devices (e.g., smartwatches), mobile electronic devices (e.g., smartphones), among other examples. Processing an optically transmissive substrate for use in a particular application may be performed using various techniques that enable freeform modification of the substrate material to obtain a desired shape or form factor. A laser cutting processes may be used to modify an optically transmissive substrate, where the substrate may be perforated by a pulsed laser beam. In such cases, localized perforations over the substrate may provide a way to cut the substrate. Some of these other different processing techniques for modifying a substrate, however, may be unable to facilitate dynamic and relatively quick changes to how the substrate is modified (e.g., by a laser beam) because a line focus of a laser beam may be fixed, and changes to the line focus may require manually adjusting or changing optical components, which is time consuming and results in inefficient processing of the substrate, among other disadvantages.

SUMMARY

The described techniques relate to improved methods, systems, devices, and apparatuses that support real-time modification of a line focus intensity distribution (e.g., a Bessel line focus intensity distribution). The described techniques and devices may provide for optical components (e.g., which may also be referred to as pre-optics) that are positioned between a laser source and a laser cutting optic used for modifying a substrate (e.g., perforating an optically transmissive substrate), where the optical component may be configured to enable a relatively quick adjustment to an input of the laser cutting optic. The optical components may include, for example, a beam deflector (e.g., an acousto-optic deflector, an electro-optic deflector), a first optic configured to output a first laser beam with a first beam width, and a second optic configured to output a second laser beam with a second beam width (e.g., a different beam width). In some examples, the set of optical components may include polarizers, one or more mirrors, and a polarizing cube configured to receive one or both of the first laser beam or the second laser beam from the first optic or the second optic, respectively. By modifying a deflection angle of the beam deflector, in some examples, an optical path of a pulsed laser may be switched between the first optic and the second optic with relatively high speed (e.g., within microseconds, within nanoseconds), much faster than other different techniques, thereby modifying the beam width of the input to the laser cutting optic in substantially real time. Switching between the different beam widths may adjust a line focus of an output of the laser cutting optic (e.g., during a single processing pass that modifies the substrate). Such devices and techniques may provide improved substrate modification by enabling relatively fast switching between different beam profiles, line focus intensities, line focus lengths, or any combination thereof. Accordingly, a substrate can be relatively quickly and efficiently modified in different ways without requiring a manual modification of optical components, or multiple processing passes, other different inefficient techniques, or any combination.

An apparatus is described. The apparatus may include a beam deflector configured to deflect a laser beam generated by a pulsed laser, a first optic configured to receive the laser beam and to output a first laser beam with a first beam width, and a second optic configured to receive the laser beam and to output a second laser beam with a second beam width. In some examples, the apparatus may include a third optic configured to receive an output of the polarizing cube and to output a third laser beam to modify a substrate to a first depth of the substrate at a first time during a single modification pass and to output a fourth laser beam to modify the substrate to a second depth of the substrate less than the first depth at a second time during the single modification pass.

A method is described. The method may include modifying an optically transmissive substrate to a first depth of the optically transmissive substrate at a first time during a single modification pass using a first output of an optic, wherein the first output is based at least in part on an input of the optic comprising a first polarized laser beam having a first beam width from a first optic. In some examples, the method may include adjusting the first output of the optic to a second output of the optic during the single modification pass using a beam deflector, wherein the second output is based at least in part on the input being adjusted to comprise a second polarized laser beam having a second beam width from a second optic. In some examples, the method may include modifying the optically transmissive substrate to a second depth of the optically transmissive substrate less than the first depth at a second time during the single modification pass using the second output of the optic.

A modified substrate is described. The modified substrate may include a first section at a first end of the modified substrate that has been modified to a first depth of the modified substrate at a first time during a single modification pass using a first beam having a first line focus configuration. In some examples, the modified substrate may include a second section of the modified substrate that has been modified to a second depth of the modified substrate less than the first depth at a second time after the first time during the single modification pass using a second beam having a second line focus configuration and a third section at a second end of the modified substrate that has been modified to the first depth of the modified substrate at a third time after the second time during the single modification pass using the first beam having the first line focus configuration.

DETAILED DESCRIPTION

Figure 1:
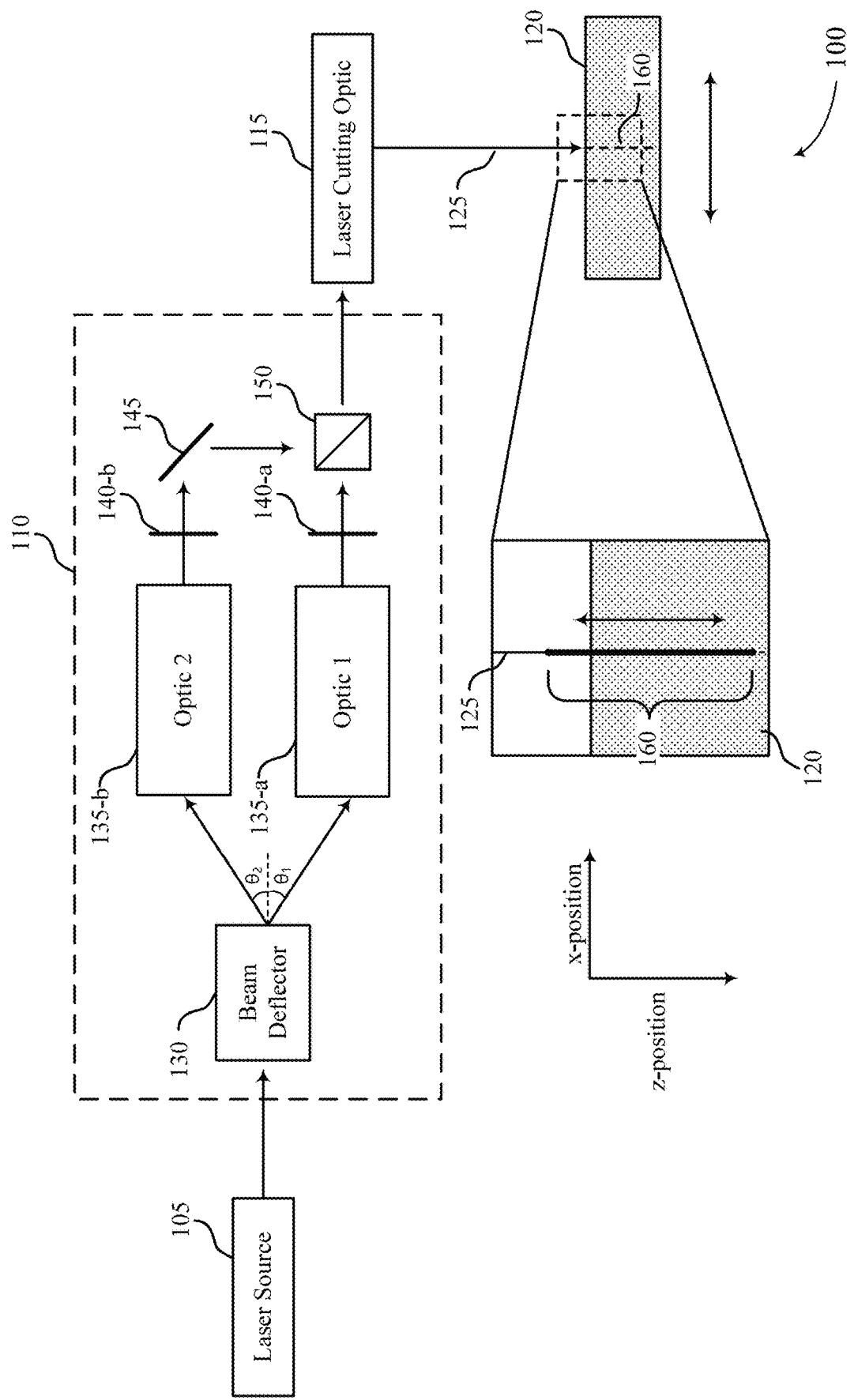
FIG. 1 illustrates an example of an optical system that supports real-time modification of a line focus intensity distribution in accordance with aspects of the present disclosure.

Optically transmissive substrates (e.g., glass materials) may have a range of uses in various products and industries. For example, glass materials may be used in various automotive application, and glass may also be used as packaging for food and drinks, as well as pharmaceuticals. In other examples, glass materials (e.g., particularly hardened and ion-exchanged glass materials) may be used in a variety of electronic devices and mobile devices, such as wireless devices (e.g., smartphones, smartwatches, laptop computers, global positioning system (GPS) devices). The production of glass materials to fit such products and applications may rely on processing techniques that accurately and efficiently shape (e.g., cut, form) a substrate to one or more dimensions appropriate for the substrate's intended application. Processing such glass materials may thus be performed using various techniques that enable freeform and up to three-dimensional cutting with relatively high precision. As one example, laser cutting techniques may be used to process a substrate with relatively high-quality cuts, as well as relatively high processing speeds and accuracy. Using such techniques, a substrate may be modified (e.g., via perforation, ablation, heating, damaging, or the like) by a focused output (e.g., a line focus) of some laser optics.

Some other different processing techniques, however, may be unable to dynamically and quickly change how a substrate is modified by the line focus. Specifically, the optics used for modifying a substrate with a laser may output a laser beam with a fixed line focus that may not be changed (e.g., in length, intensity, profile, or any combination thereof), without manually changing or adjusting the optics themselves in a time-consuming way. Thus, should a single substrate need to be processed using different techniques (e.g., applying both full perforation and partial perforation, based on one or more materials of the substrate, based on one or more coatings on the substrate), the optics of the system may have to be manually changed, resulting in added processing time, added complexity, and added processing steps, among other issues. As an illustrative example, a laser beam having a first line focus that partially perforates a substrate may be applied during a first processing pass over the substrate. But another, separate pass using a different line focus to fully perforate the substrate may not be completed until the corresponding optics are manually adjusted to modify the focal length or the depth to which the line focus perforates the substrate. In another example, a substrate may be processed to include a first perforation in a first direction and a second perforation in a second direction that overlaps some portion of the first perforation. To avoid unwanted shadowing effects when crossing a previous perforation (e.g., the first perforation), an intensity of a line focus may need to be modified, which may again require manually adjusting or changing one or more optical components before performing the second perforation. Thus, in either case for these other different techniques, the two different processing passes may be interrupted for some period of time while one or more optics are changed or adjusted, resulting in operational downtime and reduced output. Accordingly, without an ability to change optics relatively quickly, other different laser processing techniques may be affected by various inefficiencies.

As described by the present disclosure, a substrate may be modified in different ways (e.g., during a same processing pass, such as a perforation pass, an ablation modification pass, a modification pass, or the like) by relatively quickly and efficiently modifying an input of a laser cutting optic, and avoiding the multiple processing passes, downtime, and inefficiencies described above. Specifically, the techniques, systems, and devices described herein may enable substantially real-time modification of a line focus, where a length of a line focus, an intensity of the line focus, a beam profile of the line focus, or any combination thereof, among other aspects, may be modified in, for example, about 20 microseconds (µs) or less.

To enable the real-time modification of the line focus (e.g., without manually changing or adjusting optics), some optical components positioned between a laser source (e.g., a pulsed laser) and a laser cutting optic (e.g., an optic that focuses the pulsed laser beam for processing a substrate) may be used to modify an input to the laser cutting optic, which may likewise modify the line focus. The optical components may include at least one or more beam deflectors (e.g., an acousto-optic deflector, an electro-optic deflector, or others) and a set of two or more optics, as well as one or more polarizers, one or more mirrors, and one or more polarizing cubes, among other examples. The beam deflector may be configured to switch a deflection angle with a relatively fast response time (e.g., within about 5 µs to 20 µs or less, such as switching deflection angles within a few nanoseconds), where a pulsed laser beam may be deflected, by the beam deflector, to at least one of a first optic or a second optic. In one example, the beam deflector may be configured to switch between deflection angles within about 10 nanoseconds. The first optic may be configured to output a laser beam that has a different size (e.g., beam width) than an output of the second optic. The different optical paths (e.g., a first path through the first optic and a second path through the second optic) may be overlaid with one another (by one or more mirrors, beamsplitters, polarizing cubes) to be output to the laser cutting optic. Thus, by selecting or switching between one optical path or the other using the beam deflector, the laser beam input to the laser cutting optic may have different beam widths (based on the optic included in the optical path), which may accordingly modify a line focus of the laser cutting optic that is used for modifying a substrate. Here, the laser cutting optic may be fixed, while the input laser beam to the laser cutting optic may be dynamically modified for adjusting the line focus that modifies (e.g., damages, perforates) the substrate. As such, different processing techniques (e.g., full perforation and partial perforation, different line focus intensities) may be used when processing a substrate during a same processing pass (e.g., without interruption).

Aspects of the disclosure are initially described in the context of optical systems and optical components. Further examples of a line focus intensity plot and perforated substrates are also provided. Aspects of the disclosure are further illustrated by and described with reference to flowcharts that relate to real-time modification of a line focus intensity distribution.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally or alternatively solve other problems than those described herein. Further, aspects of the disclosure may provide technical improvements to other different (e.g., "conventional") systems or processes as described herein. However, the description and appended drawings include example technical improvements resulting from implementing aspects of the disclosure, and accordingly do not represent all of the technical improvements provided within the scope of the claims and the disclosure.

FIG. 1 illustrates an example of an optical system 100 that supports real-time modification of line focus intensity distribution in accordance with aspects of the present disclosure. The optical system 100 may include various optical components used for modifying a substrate, and the optical system 100 may accordingly be an example of, or be included as part of, a glass cutting device or apparatus. For example, the optical system 100 may include a laser source 105, pre-optics 110, and a laser cutting optic 115. The laser cutting optic 115 may be configured for focusing a laser beam to modify a substrate 120. In some examples, the optical system 100 may be an example of a device or system used for localized perforation of the substrate 120, which may result in relatively smooth and high-quality cuts at relatively high processing speeds and accuracy (e.g., with relatively little post-processing steps). In addition, the optical system 100 may support freeform, accurate cutting (e.g., which be referred to as or may be an example of perforation), which may allow for dynamic two-dimensional cutting, or three-dimensional cutting, or both, of the substrate 120.

As illustrated, the pre-optics 110 may be positioned operationally between the laser source 105 and the laser cutting optic 115. In other examples, the pre-optics 110 may be included as part of the laser source 105 or the laser cutting optic 115. In any cases, the pre-optics 110 may be used to modify an input of the laser cutting optic 115 such that different inputs (e.g., different laser beam widths) to the laser cutting optic 115 may result in an output 125 (e.g., a laser beam from the laser cutting optic 115) having different properties, including various properties associated with a line focus of the output 125. As described herein, the pre-optics 110 may enable relatively fast switching of the input to the laser cutting optic 115, which may in turn switch the output 125 with a same or similar response time, enabling different ways in which the substrate 120 is modified by the output 125 (e.g., during a single processing pass, without manually changing the components of the pre-optics 110). The optical system 100 may thus enable efficient modification of the substrate 120 through real-time adjustments to the output 125 of the laser cutting optic 115 (e.g., by modifying an optical path of the laser source 105 through the pre-optics 110).

The laser source 105 may be an example of a pulsed laser (e.g., an ultrashort pulsed laser, a picosecond pulsed laser, a nanosecond pulsed laser) that is configured to operate at some wavelength of light, λ. The laser source 105 may generate optical power in multiple pulses (e.g., bursts) with some repetition. Each laser beam pulse may include a burst of multiple sub-pulses, and a duration of a sub-pulse may be some number of nanoseconds (ns) in duration, some number of femtoseconds (fs) in duration, among other example durations. In some examples, the duration of one pulse (e.g., including the burst of multiple sub-pulses) may be some number of microseconds in duration. As one example, the laser source 105 may be configured to operate using a pulse duration of 10 μs, which may correspond to an operating frequency of 100 kilohertz (kHz). In other examples, the laser source 105 may be configured to operate using an operating frequency that is less than or greater than 100 kHz. The laser source 105 may be an example of a mode-locked laser, a Q-switching laser, a pulsed-pumping laser, among other examples, that generates a pulsed output (e.g., a non-continuous output). The laser source 105, however, may be an example of another type of laser not mentioned herein, and the examples described herein should not be considered limiting to the scope covered by the claims or the disclosure. In some aspects, the wavelength of the laser source 105 may be configured for processing the substrate 120. For instance, the wavelength, k, of the laser source 105 may be based on a material of the substrate 120 such that the substrate 120 is substantially transparent to the laser light generated by the laser source 105. In some examples, the optical system 100 may include a different number of (e.g., more) laser sources 105 than illustrated in optical system 100, which may provide for additional flexibility and configuration of the optical system 100, thereby enhancing an ability to efficiently modify the substrate 120. In cases where multiple laser sources 105 are included in the optical system 100, the optical system 100 may accordingly include one or more optical components (e.g., within the pre-optics 110, external to the pre-optics 110) for directing multiple laser beams to an input of one or more laser cutting optics 115.

The pre-optics 110 may include a number of optical components configured to modify (e.g., alter, change, adjust, switch) an output of the laser source 105 prior to being input to the laser cutting optic 115. For example, the pre-optics 110 may include a beam deflector 130, two or more optics 135 (e.g., a first optic 135-a, a second optic 135-b, and so forth), one or more polarizers 140 (e.g., a first polarizer 140-a, a second polarizer 140-b), one or more mirrors 145, and one or more polarizing cubes 150. The pre-optics 110 may include one or more additional components, or different components, or any combination thereof.

The beam deflector 130 may be an example of a beam deflector component (e.g., an acousto-optic deflector, an electro-optic deflector, a beam-steered deflector). In some examples, the beam deflector 130 may be referred to as a switch (e.g., an acousto-optic switch), a modulator (e.g., an acousto-optic modulator), or some other terminology. In any case, the beam deflector 130 may be configured to modify a direction of the output of the laser source 105 such that the output of the laser source 105 is directed through one or more optics 135. For example, the beam deflector 130 may be an acousto-optic modulator in which changes in a refraction index of a material (e.g., by acoustic compression or rarefaction) may diffract incident light in some direction (e.g., at a deflection angle, θ). In such cases, an acoustic frequency may be used to direct the incident light (e.g., the pulsed laser beam from the laser source 105) in different angular positions.

The beam deflector 130 may be configured to change the deflection angle relatively quickly, for example, with a response time of some number of microseconds or less (e.g., between about 10 nanoseconds and about 20 microseconds).

In some aspects, the beam deflector 130 may be configured to change the deflection angle with a response time between about 10 nanoseconds and about 100 nanoseconds. In some other aspects, the beam deflector 130 may be configured to change the deflection angle with a response time between about 5 microseconds and about 20 microseconds. As an example, the beam deflector 130 may be configured to deflect the incident laser beam in a first direction (e.g., $\theta_1$) at a first time and then deflect the incident laser beam, at a second time after the first time, in a second direction (e.g., $\theta_2$) different from the first direction. In some aspects, the change in direction of the beam deflection angle may be within, for example, about 5 µs. In other cases, the beam deflector 130 may modify an output direction within about 5 µs and 20 µs. In some other examples, the beam deflector may modify the output direction within about 10 nanoseconds or other durations of time. By deflecting the laser beam output by the laser source 105 in different directions (e.g., based on a configuration of the beam deflector 130), the laser beam may be directed to one or more optics 135. Because the beam deflector 130 may provide relatively fast angle variation with response times on the order of microseconds (or shorter), the beam deflector 130 may enable real-time changes of a line focus intensity distribution during processing of the substrate 120, as described in further detail below.

In some examples, the beam deflector 130 may be configured as a beam splitter. In such cases, the beam deflector may split an incident beam from the laser source 105 in two or more directions. As an example, the beam deflector 130 may split a single laser beam (e.g., a pulsed laser beam) in the first direction (e.g., $\theta_1$) and the second direction (e.g., $\theta_2$) simultaneously. In such cases, the beam deflector may direct the single laser beam to two or more optical paths (e.g., to multiple optical components, such as the optics 135, among other example components), where the beams may be directed to an input of the laser cutting optic 115.

The optics 135 (e.g., one or both of the first optic 135-*a* or the second optic 135-*b*) may include any number of one or more optical components, such as lenses, windows, prisms, filters, thin films, mirrors, telescopes, axicons, beam expanders, reflective optics, refractive optics, collimating optics, focusing optics, or the like. In some examples, the optics 135 may be configured to modify one or more properties of an incident laser beam. As an example, the first optic 135-*a* and the second optic 135-*b* may be configured to modify a beam width of an incident laser beam. In particular, the first optic 135-*a* may modify the beam width of an incident beam (e.g., from the laser source 105 and deflected by the beam deflector 130) to a first beam width. Likewise, the second optic 135-*b* may be configured to modify the beam width of an incident beam (e.g., from the laser source 105 and deflected by the beam deflector 130) to a second beam width different from the first beam width. In other examples, the first optic 135-*a* may not modify the beam width of the laser source 105, while the second optic 135-*b* may modify the beam width, or vice versa. Put another way, at least one beam path (e.g., through the first optic 135-*a* or through the second optic 135-*b*) may alter (e.g., increase/decrease the beam width of) the pulsed laser beam of the laser source 105. In any case, an output of each optic 135 (e.g., the first optic 135-*a*, the second optic 135-*b*) may have different properties (e.g., beam widths, in this example). In some examples, a different number of optics 135 (e.g., greater, fewer) may be included in the optical system 100.

The one or more polarizers 140 of the pre-optics 110 (e.g., first polarizer 140-*a*, second polarizer 140-*b*) may be configured to polarize an output of an optic 135. For example, a first polarizer 140-*a* may be configured to polarize an output of the first optic 135-*a*, and a second polarizer 140-*b* may be configured to polarize an output of the second optic 135-*b*.

In some examples, the pre-optics 110 may include one or more mirrors 145 configured to modify a direction of an output of the one or more optics 135. For example, a mirror 145 may be positioned after the second optic 135-*b* and the second polarizer 140-*b*, and the mirror 145 may be configured to modify a direction of the polarized output of the second polarizer 140-*b* (e.g., a polarized laser beam having a beam width based on the second optic 135-*b*). In such cases, the laser beam may be directed to the polarizing cube 150.

The polarizing cube 150 may be an example of a polarizing beamsplitter cube that includes, for example, two or more prisms. The polarizing cube 150, among other components, may be used to for overlaying multiple optical beam paths within the pre-optics 110. For example, the polarizing cube 150 may be used as a beam combiner (e.g., when configured in a "reverse" orientation), and the polarizing cube may be configured to overlay at least a first optical beam path (e.g., an output of the laser source 105 through the beam deflector 130, the first optic 135-*a*, and the first polarizer 140-*a*) and a second optical beam path (e.g., the output of the laser source 105 through the beam deflector 130, the second optic 135-*b*, the second polarizer 140-*b*, and the mirror 145). An output of the polarizing cube may include a polarized laser beam that is directed to (e.g., and serves as) the input to the laser cutting optic 115.

The laser cutting optic 115 may be configured for freeform and up to multi-dimensional (e.g., two-dimensional, three-dimensional) modification of substrates. For example, the laser cutting optic 115 may include one or more optical components used to focus a laser beam (e.g., the output 125, a pulsed laser beam) into a line focus 160 within the substrate 120. That is, the laser cutting optic 115 may be configured to focus laser light into a relatively thin line (e.g., the line focus 160). In some examples, the laser cutting optic 115 may include one or more lenses, axicons, or other optical components. In some examples, the output 125 of the laser cutting optic 115 may be an example of a Bessel beam (e.g., a non-diffracting beam having relatively high irradiance and a distribution described by a Bessel function) based on the one or more optical components of the laser cutting optic 115. In some examples, a main distribution of the line focus 160 (which may also be referred to as a focal line, or other terminology) of the laser cutting optic 115 may be positioned such that the line focus 160 damages (e.g., perforates, ablates, modifies) one or more portions of the substrate 120. In some examples, the laser cutting optic 115 may be configured to define a position of the modification of the substrate 120 or a focus zone of the output 125 (e.g., a z-position of the line focus 160 relative to the substrate 120 or the laser cutting optic 115), or both, whereas positional differences of the overlaid laser beams (e.g., output from the polarizing cube 150) may not result in positional differences of the line focus 160. Thus, the line focus 160 may be used for processing (e.g., cutting, perforation, ablation, other modification) of the substrate 120 using the laser cutting optic 115. In some cases, perforation of the substrate 120 may include localized perforations with a diameter of, for example, about 800 nanometers up to about 2 or 3 micrometers.

In some examples, the substrate 120 may be moved (e.g., translated horizontally, translated through one or more x-positions) relative to the laser cutting optic 115, thereby enabling processing of the substrate 120 over one or more different sections (e.g., portions) of the substrate 120. In other examples, the substrate 120 may be stationary while the laser cutting optic 115 may move with respect to the substrate 120.

Processing (e.g., modifying, perforating, ablating, damaging) the one or more portions of the substrate 120 using the line focus 160 may be based on a frequency of the laser source 105. For example, a single modification pass (e.g., applied to the substrate 120) may include a laser beam pulse including a burst of sub-pulses. As discussed above, the duration of one sub-pulse may have various durations (e.g., from nanoseconds in duration to femtoseconds in duration, among other examples) and the duration of one pulse including the burst of sub-pulses may also have some duration (e.g., microseconds in duration). In some cases, a modification pass (e.g., a perforation pass in which at least some portion of the substrate 120 may be perforated) may correspond to a frequency of the laser source 105. As an example, a modification pass may be about 10 μs in duration, where the laser source 105 may operate at about 100 kHz. In some aspects, a modification pass may be less than about 100 μs in duration. It is noted that these examples are provided for illustrative purposes only and should not be considered limiting to the scope covered by the claims or the disclosure, as other durations of processing passes may be possible. Thus, during a single modification pass, the substrate 120 may be modified in one or more ways, for example, through perforating the substrate 120 to different depths. Further, using the described techniques, a line focus may be modified in less time than the duration of a single modification pass, thereby enabling one or more different types of modification to the substrate 120 within a same modification pass (e.g., substantially in real time and without manually changing one or more optical components). As disclosed herein, a modification pass is a time period in which a laser line focus is applied to one or more portions of the substrate 120 resulting in modification of some volume of the substrate 120.

In some examples, each modification pass may include a perforation pass to perforate the substrate 120. Additionally or alternatively, each modification pass may include one or more types of modification to the substrate, for example, including a first modification pass to modify (e.g., perforate, ablate) the substrate 120 using a first technique (e.g., to a first depth of the substrate 120) and a second modification pass modify the substrate 120 using a second, different technique (e.g., to a second depth of the substrate 120 different than the first depth). The described techniques, however, may not be limited to using a perforation pass as modification pass. For instance, each modification pass may differ in at least one of a focal position, focal length, intensity, beam shape (e.g., focal shape), or any combination thereof. In some aspects, a beam shape may include an elongated focal zone (e.g. a Bessel beam). Further, a beam shape of respective modification passes (e.g., a first modification pass, a second modification pass) may be configured (e.g., by optics) to achieve a top hat shape, among other examples.

The substrate 120 may be an example of an optically transmissive substrate. For instance, the substrate may be optically transmissive to some wavelengths of light (e.g., visible light, infrared light, ultraviolet light). In some aspects, the substrate 120 may be optically transmissive to the wavelength, k, generated by the laser source 105. As such, the substrate 120 may be an example of a glass material that may include, for example, a glass material including one or more glass compositions. In some examples, the substrate 120 may include a soda-lime glass material, a borosilicate glass material, an aluminosilicate glass material, an alkali aluminosilicate glass material, an alkaline earth aluminosilicate glass material, an alkaline earth boro-aluminosilicate glass material, a fused silica glass material, a crystalline material (e.g., sapphire, silicon, gallium arsenide, other materials, or any combination thereof), among other examples. In some example, the substrate 120 may include a material that is strengthened or hardened, or both, by one or more thermal processes, chemical processes, or other processes. For example, the substrate 120 may include an ion-exchanged material or an ion-exchangeable material, where ion exchange may relatively strengthen the material. In some aspects, the substrate 120 may be strengthened, or hardened, or both, before or after the substrate is processed (e.g., modified by an output of the laser cutting optic 115).

In some aspects, the substrate 120 may be processed (e.g., modified, perforated, ablated) so as to provide a processed substrate 120 having different properties that may be based on how the substrate 120 is used (e.g., in some product, in a particular application, in some device). As one example, the substrate 120 may be an example of an optical conductor, and a surface of the substrate 120 (e.g., a contacting surface, such as a surface that may be in contact with one or more other optical conductors or components) may need to have properties for efficient coupling. In such cases, by cutting the substrate 120 using, for example, perforation techniques, it may be desirable to avoid perforating the substrate 120 through a full thickness of the substrate 120 (e.g., at least at a zone or location where the substrate may be coupled) because perforations through the entire substrate 120 may, in some cases, roughen a cut surface of the substrate 120. Therefore, perforating the substrate 120 may include perforating up to some depth of the substrate 120 that is less than the full thickness of the substrate 120, which may enable breaking of the substrate 120 (e.g., along a cutting line) based on multiple localized partial perforations. To achieve the partial perforation, the line focus 160 may be configured to not extend completely through the substrate 120. As described herein, the position of the line focus 160 may be adjusted (e.g., for partial perforation of the substrate 120) by modifying an input to the laser cutting optic 115 using the pre-optics 110. As a result of the partial perforation, a processed portion (e.g., a sidewall) of the substrate 120 may include a relatively smooth surface for coupling.

As described above, the modification of the beam deflector 130 may adjust the optical path of a pulsed laser beam from the laser source 105, where different optical paths may result in respective laser beams having different beam widths. The different beam widths may, in turn, correspond to a modification of the line focus 160 (e.g., a main distribution of the line focus 160) used to modify the substrate 120. For example, an intensity (e.g., an optical power per unit area) of the line focus 160 may be modified when beams having different beam widths are input to the laser cutting optic 115. In one example, the output 125 (and the line focus 160) may have a beam intensity profile (e.g., a Gaussian beam profile, a top-hat beam profile) that may be modified by adjusting an input to the laser cutting optic 115. A Gaussian beam profile may describe a laser beam having a beam profile that symmetrically decreases as the distance from the center of the laser beam cross-section increases, which may be described by a Gaussian function. Further, a top hat beam profile (which may also be referred to as a flat top beam profile, tophat beam profile, or top-hat beam profile) beam profile may have a relatively constant profile through the cross-section of the laser beam. In some examples, a laser beam with a top-hat beam profile may be formed by a Gaussian beam.

In some examples, the profile of the beam itself may be modified by changing the input to the laser cutting optic 115 (e.g., using different optical paths selected by the configuration of the beam deflector 130). Additionally or alternatively, a position (e.g., the z-position) of a main distribution of the line focus 160 may be changed by modifying the input to the laser cutting optic 115. Here, a first input to the laser cutting optic 115 may correspond to a first z-position of the line focus 160 within the substrate, whereas a second input to the laser cutting optic 115 may correspond to a second z-position that is, for example, closer to or further away from the laser cutting optic 115, which may enable partial or full-perforation of the substrate 120.

Thus, the pre-optics 110 may enable dynamic modification of the line focus 160 by adjusting one or more properties (e.g., a beam size, a beam width) of a laser beam input to the laser cutting optic 115 during a single modification pass. In such cases, switching between a first beam width and a second beam width that is different (e.g., greater, smaller) than the first beam width using the beam deflector 130, the substrate may be processed in ways that reduce material defects, or enable customizable modification to a substrate in real time. For example, the beam deflector 130 may be used to adjust the input to the laser cutting optic 115 that may accordingly modify a position (e.g., a z-position) or a length of the line focus 160. Specifically, at a first time of a single modification pass, the beam deflector 130 may be used to deflect the pulsed laser beam to an optical path including at least the first optic 135-*a*, resulting in a laser beam having a beam width based on the configuration of the first optic 135-*a*, which may be an input to the laser cutting optic 115 (e.g., after passing through the polarizing cube 150). Based on the beam width, the output 125 of the laser cutting optic may have a line focus 160 that partially perforates the substrate 120 (e.g., through a depth of the substrate 120 that is less than a full depth (e.g., thickness) of the substrate 120).

Then, during the single modification pass (e.g., about 10 μs in duration) and at a second time after the first time (e.g., in some number of ns), the beam deflector 130 may be operated to change the deflection angle, thereby deflecting the pulsed laser beam towards the second optic 135-*b*. In this example, the second optic 135-*b* may be configured to output a laser beam having a different beam width, and the output 125 of the laser cutting optic 115 may have a line focus 160 that fully perforates the substrate 120 (e.g., through a depth of the substrate 120). That is, during a same modification pass, the substrate 120 may be both partially perforated and fully perforated through switching the deflection angle of the beam deflector 130, which correspondingly modifies the optical path of the pulsed laser beam input to the laser cutting optic 115. Additionally or alternatively, switching the optical path of the pulsed laser may enable switching between different beam profiles (e.g., top-hat, focal height) for the line focus 160, which may, for example, generate some particular cutting profiles when processing the substrate 120, enabling further flexibility and design options for a processed substrate 120.

Some aspects of the subject matter described herein may be implemented to realize one or more advantages. For example, the described systems, devices, and techniques may support improvements in processing optically transmissive substrates, providing improved efficiency and capability, for example, when perforating the substrate. For example, a substrate may be modified in different ways in a single processing pass and without physically modifying one or more components of the optical system 100.

Additionally, because an intensity profile may be modified in substantially real time, when one perforation pass may cross over at least a portion of an existing perforation, the intensity profile may be adjusted in such a way that the adjustments avoid or significantly reduce any shadowing effects when overlapping with the existing perforation. Similarly, the substrate 120 may have one or more coatings, and the line focus 160 may be efficiently modified in a same processing pass to relatively reduce damage to the one or more coatings, as one example. More generally, the use of the pre-optics 110 (including at least the beam deflector 130 and the one or more optics 135) may avoid inefficiencies, downtime, complexity, or any combination thereof, when a line focus is fixed and may only be modified when one or more optical components are manually modified.

It is noted that, as used herein, the terminology "processing" or "laser processing" may refer to techniques that include directing a laser beam onto a substrate 120, into the substrate 120, or both, which may result in perforating, damaging, ablation, or other modification of the substrate 120. For instance, a processing pass (e.g., a perforation pass, a modification pass) may include at least partially perforating the substrate 120. In addition, while some aspects of the disclosure are described with reference to perforating the substrate 120, it is understood that the systems, devices, and techniques described herein may similarly be used with other material modification processes and techniques (e.g., ablation, heating, or the like). Further, one or more of the components of the optical system 100 may be replaced or modified to include different or similar components to those described herein to achieve the same or similar results, functionality, and materials as described.

Figure 2:
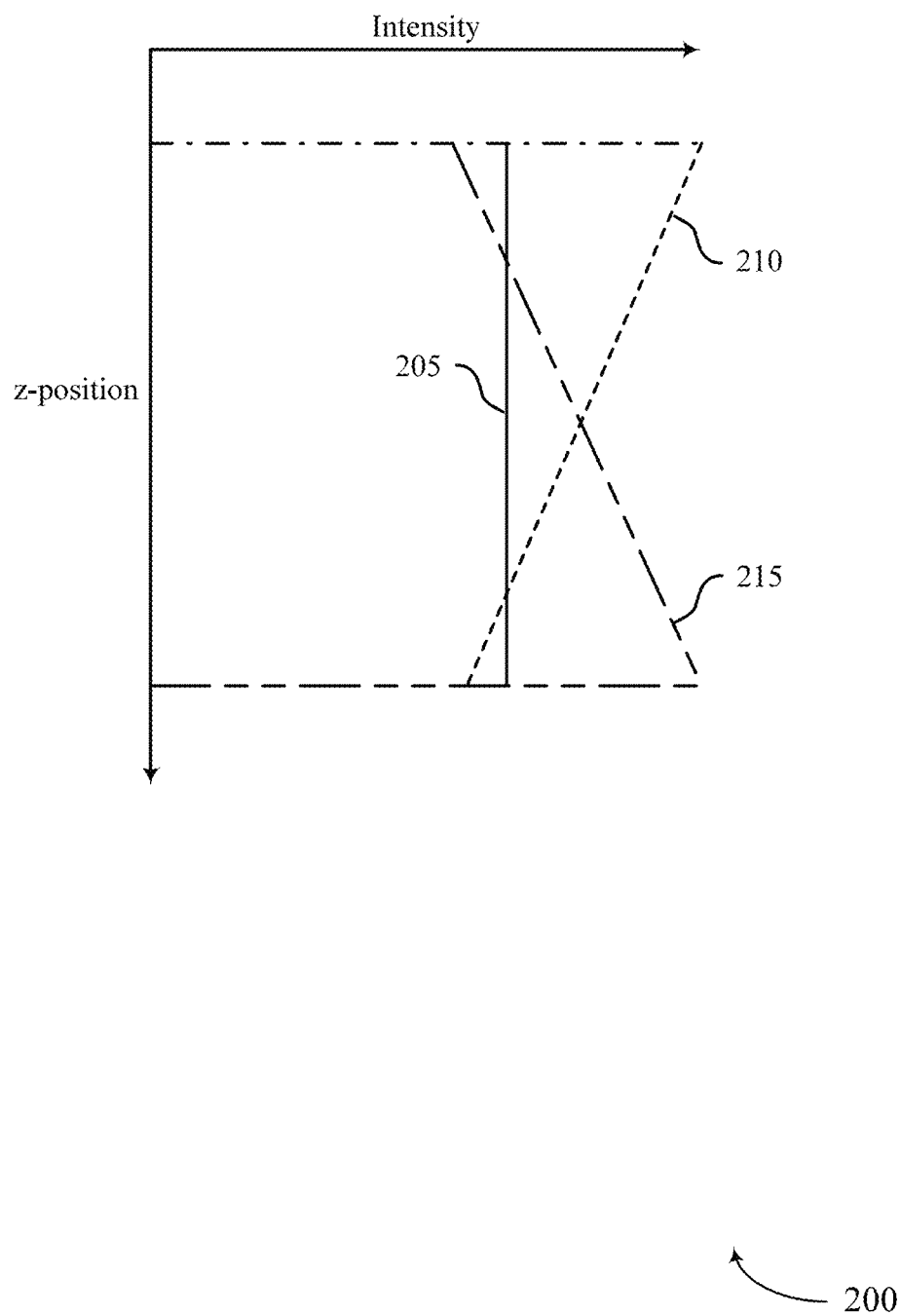
FIG. 2 illustrates an example of a beam distribution that supports real-time modification of a line focus intensity distribution in accordance with aspects of the present disclosure.

FIG. 2 illustrates an example of a line focus intensity plot 200 that supports real-time modification of line focus intensity distribution in accordance with aspects of the present disclosure. As an example, the line focus intensity plot 200 may illustrate an effect of input beam size (e.g., a beam width input into an optic, such as a laser cutting optic 115 described with reference to FIG. 1) on a location (e.g., a z-position, a vertical position) of a line focus intensity. Here, the z-position may correspond to a position of a line focus (e.g., the line focus 160 described with reference to FIG. 1) relative to an optic or an optically transmissive substrate, where the line focus may be used to modify (e.g., perforate) the optically transmissive substrate. As described herein, the input beam size may be relatively quickly and efficiently modified through the use of one or more optical components including, for example, a beam deflector and other optics, polarizers, mirrors, and polarizing cubes (e.g., the pre-optics 110 described with reference to FIG. 1). For example, the input beam size may be adjusted using a beam deflector with a response time of less than 20 ns, which may modify an intensity of a beam profile. In some examples, the beam profile described with reference to FIG. 2 may be a top-hat beam profile, but other beam profiles (e.g., Gaussian) may have similar modifications to their intensity as discussed below.

The line focus intensity plot 200 may show that a first input beam size 205 (e.g., for a top-hat distribution) may be configured to have a relatively constant intensity over various positions (e.g., over a range of z-positions, which may be at least partially located in a substrate). A second input beam size 210, however, may be smaller than the first input beam size 205, which may result in a relatively greater intensity at some z-positions (e.g., relatively closer to a laser cutting optic and at a different position in the substrate). In other cases, a third input beam size 215 may be greater than the first input beam size 205 and the second input beam size 210, which may result in a relatively greater intensity of a line focus at some other z-positions (e.g., relatively further from the laser cutting optic and at a different position in the substrate). Thus, an intensity distribution of a line focus generated by a laser cutting optic may be altered by modifying (e.g., increasing or decreasing) the input beam size (e.g., to input beam size 205, 210, 215, among others). Such configuration of the line focus intensity distribution may be used to overcome shading effects at perforation cross sections (e.g., cross sections that have been perforated by a laser beam), for example, by increasing an intensity at the bottom of the line focus used for perforating the substrate. Further, due to the relative speed at which the input beam size (and the line focus) may be modified by using a beam deflector described herein (e.g., with a response time of 20 μs, or less), the different intensity profiles may be achieved during a same processing pass on the substrate, enhancing an ability to dynamically modify the substrate.

Figure 3:
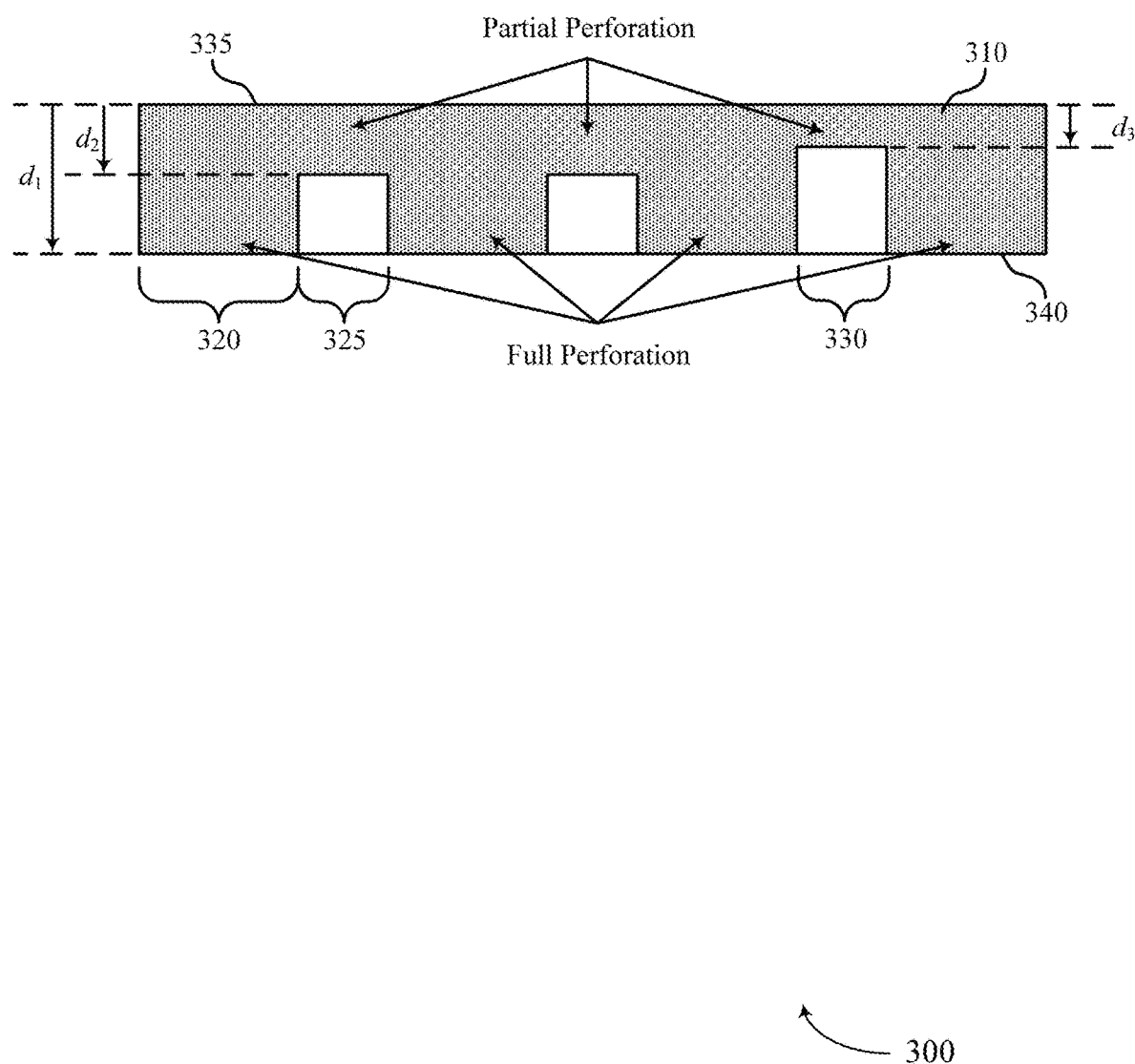
FIG. 3 illustrates an example of a cross-sectional view of a perforated substrate that supports real-time modification of a line focus intensity distribution in accordance with aspects of the present disclosure.

FIG. 3 illustrates an example of a cross-sectional view 300 of a perforated substrate that supports real-time modification of line focus intensity distribution in accordance with aspects of the present disclosure. For example, the cross-sectional view 300 may show a substrate 310 that has been perforated in different ways including full perforation and partial perforation. In particular, one or more portions of the substrate may be an example of a section 320 that has been perforated to a first depth (e.g., fully perforated), whereas one or more different portions of the substrate may be an example of other sections 325 that have been perforated to one other more other depths (e.g., partially perforated). That is, the substrate 310 may include at least one section 320 that has been fully perforated and at least one section 325 that has been at least partially perforated. The perforated substrate 310 may be an example of the substrate 120 described with reference to FIG. 1.

As described herein, an input to a laser cutting optic may be modified using a beam deflector (e.g., a beam deflector 130 described with reference to FIG. 1) and one or more other optical components, where a size of a pulsed laser beam may be modified based on an optical path selected by the beam deflector. The modification of the input may likewise correspond to a modification of a line focus used to modify (e.g., perforate) the substrate 310. In particular, a first configuration of the line focus (e.g., based on an optical path of a pulsed laser beam) may be used to perforate the substrate to a first depth, $d_1$, at a first time, where the first depth, $d_1$, may be through a full depth of the substrate 310 (e.g., a full thickness of the substrate 310), resulting in a full perforation of the substrate 310 at section 320 (e.g., at an end of the substrate 310). Further, a second configuration of the line focus (e.g., based on another, different optical path of the pulsed laser beam) may be used to perforate the substrate to a second depth, $d_2$, at a second time (e.g., after the first time), where the second depth, $d_2$, may be through less than the full depth of the substrate 310 (e.g., partially through the full thickness of the substrate 310), resulting in a partial perforation of the substrate 310 at section 325. Further, a third configuration of the line focus (e.g., based on another, different optical path of the pulsed laser beam) may be used to perforate the substrate to a third depth, $d_3$, at a third time (e.g., after the first time, after or before the second time), where the second depth, $d_3$, may be through less than the full depth of the substrate 310 (e.g., partially through the full thickness of the substrate 310), resulting in a partial perforation of the substrate 310 at section 330. In some examples, $d_3$ may be less than $d_2$, as shown in FIG. 3, and various other depths (e.g., that may be less than the full thickness of the substrate 310) are within the scope of the present disclosure. In addition, the full and partial perforation of the substrate 310 may be repeated one or more times, which may provide for a perforated substrate 310 that is processed using different perforation techniques.

In some aspects, modifying (e.g., perforating, ablating) the substrate 310 to varying depths (e.g., the first depth $d_1$, second depth $d_2$, third depth, $d_3$, or the like) may refer to a distance from a surface of the substrate 310 into a volume of the substrate 310. Here, the surface from which a depth (e.g., a depth range) may be measured may include a first surface 335 of the substrate 310 upon which a laser beam contacts (e.g., for modifying the substrate 310). In other examples, one or more depths corresponding to the modification of the substrate 310 into the volume of the substrate 310 may refer to a distance from a second surface 340 opposite the first surface 335 and into the substrate 310. Additionally or alternatively, a depth may be regarded as a depth range inside the volume of the substrate 310 between first surface 335 and the second surface 340.

As described herein, changing the properties of laser beam input to a laser cutting optic relatively quickly may avoid multiple, time-consuming processes when the substrate 310 is to include at least one partially-perforated section 325 and another section that is perforated to a different depth (e.g., section 320). More specifically, by changing the beam width of the input to the laser cutting optic using an acousto-optic deflector, electro-optic deflector, or other type of deflector, the substrate may be perforated to different depths (e.g., $d_1$, $d_2$) without moving either the substrate or the laser cutting optic relatively closer or relatively further away from each other. For instance, a main distribution of a line focus may be translated to different vertical positions (e.g., z-positions, up, down) with relation to the substrate 310, providing for relatively fast changes of the depth to which the substrate 310 is modified. Such techniques may accordingly avoid multi-step process sequence where the substrate 310 is fully perforated in multiple locations first, then the vertical position of the line focus is moved (e.g., by manually or physically moving the laser cutting optics up or down) and the substrate is partially perforated in other locations, which may be time-consuming and inefficient. Instead, by modifying the line focus (e.g., by changing the beam size input to the laser cutting optic), multiple perforation depths may be achieved in substantially real time and completed in a single perforation pass (e.g., a modification pass during which some volume of the substrate is modified by the line focus).

Figure 4A:
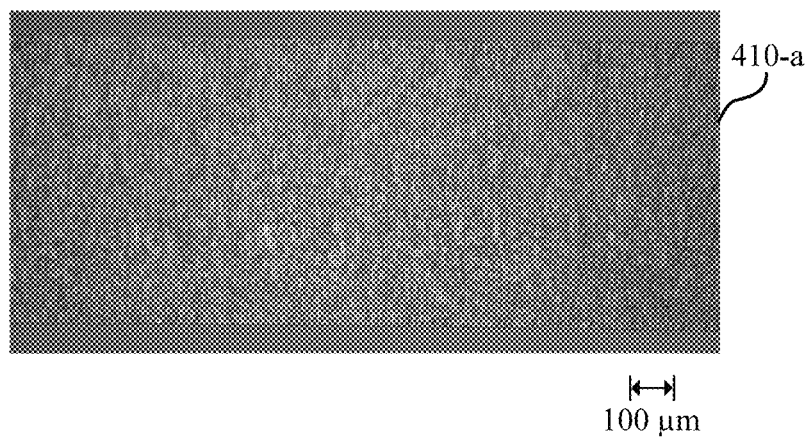
FIGS. 4A and 4B illustrate cross-sectional views of a perforated substrate that supports real-time modification of a line focus intensity distribution in accordance with aspects of the present disclosure.
Figure 4B:
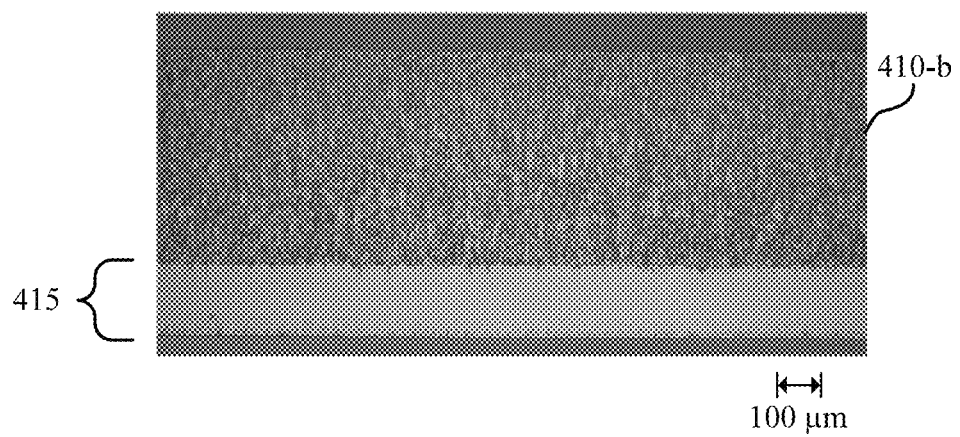

FIGS. 4A and 4B illustrate cross-sectional views 400-*a* and 400-*b* of a perforated substrate that supports real-time modification of a line focus intensity distribution in accordance with aspects of the present disclosure. In particular, FIG. 4A illustrates a cross-sectional view of a perforated substrate 410-*a* that has been fully perforated (e.g., through a full depth of the substrate 410-*a*), whereas FIG. 4B illustrates a cross-sectional view 400-*b* of a perforated substrate 410-*b* that has been partially perforated (e.g., to a depth less than the full depth of the substrate 410-*b*). In some examples, the perforated substrate 410-*a* and perforated substrate 410-*b* may be examples of different portions of a same substrate 410 that has been perforated during a single perforation pass. For example, the perforated substrate 410-*a* and perforated substrate 410-*b* may be an example of the substrate 120 described with reference to FIG. 1 or the substrate 310 described with reference to FIG. 3. Additionally or alternatively, the perforated substrate 410-*a* may be an example of the fully-perforated section 320 described with reference to FIG. 3, and the perforated substrate 410-*b* may be an example of the partially-perforated section 325 described with reference to FIG. 3.

As illustrated by FIG. 4A, the perforated substrate 410-*a* may be perforated through a full depth of the substrate, where the perforated substrate 410-*a* has been modified, for example, by a pulsed laser. The pulsed laser may be used to perforate the substrate 410-*a* using a laser cutting optic (e.g., the laser cutting optic 115 described with reference to FIG. 1), where an input of the laser cutting optic may be modified by a configuration of optical components. In such cases, modifying the input of the laser cutting optic may result in an output of the laser cutting optic having some line focus intensity, line focus profile, line focus length, or any combination thereof, that enables full perforation the substrate 410-*a*. In such cases, the perforated substrate 410-*a* may be perforated while moving the substrate relative to the output of the laser cutting optic during a modification pass (e.g., a perforation pass).

In addition, during the same modification pass, the perforated substrate 410-*b* may be a result of modifying the input of the laser cutting optic to provide a different line focus intensity, line focus profile, line focus length, or any combination thereof, that enables partial perforation of the substrate 410-*b*. In particular, as the substrate 410-*a* is moving relative to the output of the laser cutting optic, a beam deflector (e.g., the beam deflector 130 described with reference to FIG. 1) may be modified to adjust an optical beam path of the pulsed laser. The modified optical beam path may result in an input to the laser cutting optic having a different beam width, where the different beam width may result in an output of the laser cutting optic to have some line focus intensity, line focus profile, line focus length, or any combination thereof, that enables partial perforation of the substrate. In some cases, the output of the beam deflector may be modified relatively quickly, for example within 5 to 15 µs. As such, the modified line focus may partially perforate the substrate 410-*b*, leaving some portion 415 of the substrate 410-*b* intact (e.g., un-perforated).

Figure 5:
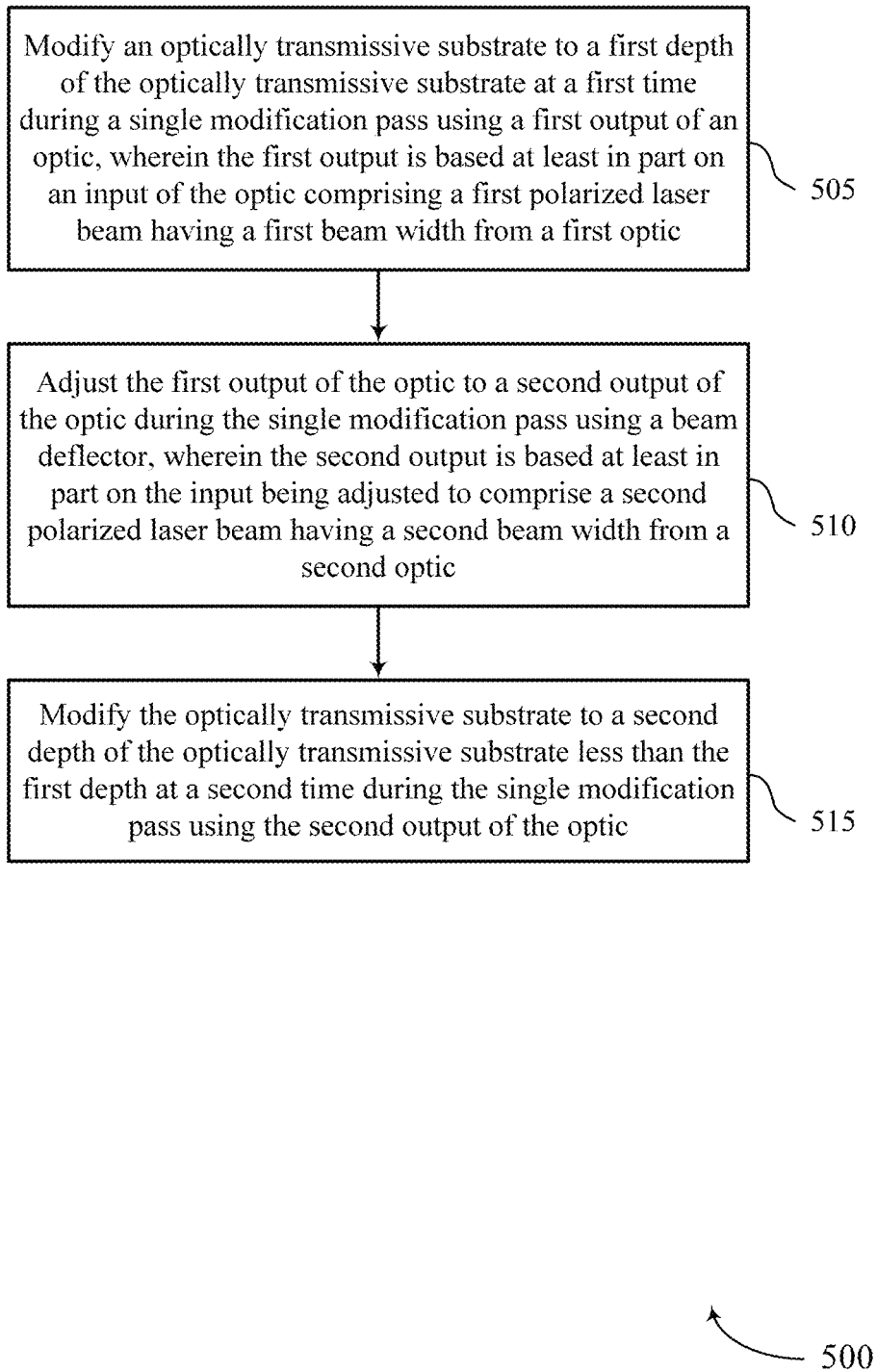
FIGS. 5 through 7 show flowcharts illustrating methods that support real-time modification of a line focus intensity distribution in accordance with aspects of the present disclosure.

FIG. 5 shows a flowchart illustrating a method 500 that supports real-time modification of line focus intensity distribution in accordance with aspects of the present disclosure. The operations of the method 500 may be implemented by a device or its components as described herein. For example, the operations of the method 500 may be performed by an optical device including a laser cutting optic as described with reference to FIGS. 1 through 4. In some examples, a device may execute a set of instructions to control the functional elements of the device to perform the described functions. Additionally or alternatively, the device may perform aspects of the described functions using special-purpose hardware.

At 505, the method may include modifying an optically transmissive substrate to a first depth at a first time during a single modification pass (e.g., a time period in which a laser line focus is applied to one or more portions of the optically transmissive substrate resulting in modification of some volume of the optically transmissive substrate) using a first output of an optic, wherein the first output is based at least in part on an input of the optic comprising a first polarized laser beam having a first beam width from a first optic. The operations of 505 may be performed in accordance with examples as disclosed herein.

At 510, the method may include adjusting the first output of the optic to a second output of the optic during the single modification pass using a beam deflector, wherein the second output is based at least in part on the input of the optic being adjusted to comprise a second polarized laser beam having a second beam width from a second optic. The operations of 510 may be performed in accordance with examples as disclosed herein.

At 515, the method may include modifying the optically transmissive substrate to a second depth less than the first depth at a second time during the single modification pass using the second output of the optic. In such cases, the single modification pass may include two or more different modifications (e.g., to different depts) to the optically transmissive substrate within a same period of time that the laser line focus is applied to the optically transmissive substrate. The operations of 515 may be performed in accordance with examples as disclosed herein.

In some examples, an apparatus as described herein may perform a method or methods, such as the method 500. The apparatus may include, features, circuitry, logic, means, or instructions (e.g., a non-transitory computer-readable medium storing instructions executable by a processor) for modifying an optically transmissive substrate to a first depth of the optically transmissive substrate at a first time during a single modification pass using a first output of an optic, where the first output is based at least in part on an input of the optic comprising a first polarized laser beam having a first beam width from a first optic, adjusting the first output of the optic to a second output of the optic during the single modification pass using a beam deflector, where the second output is based at least in part on the input being adjusted to comprise a second polarized laser beam having a second beam width from a second optic, and modifying the optically transmissive substrate to a second depth of the optically transmissive substrate less than the first depth at a second time during the single modification pass using the second output of the optic.

In some examples of the method 500 and the apparatus described herein, modifying the first output of the optic may include operations, features, circuitry, logic, means, or instructions for adjusting, based at least in part on an output angle of the beam deflector, an optical beam path of a pulsed laser beam from a first optical beam path comprising the first optic and a first polarizer to a second optical beam path comprising the second optic and a second polarizer, wherein modifying the optically transmissive substrate using the first output may be based at least in part on the first optical beam path and modifying the optically transmissive substrate using the second output may be based at least in part on the second optical beam path.

In some examples of the method 500 and the apparatus described herein, the first output comprises a first beam having a first focal line length based at least in part on the first beam width and the second output comprises a second beam having a second focal line length different than the first focal line length based at least in part on the second beam width.

Some examples of the method 500 and the apparatus described herein may further include operations, features, means, or instructions for modifying the output angle of the beam deflector from a first output angle to a second output angle within a duration that may be between about 10 nanoseconds and about 20 microseconds.

Some examples of the method 500 and the apparatus described herein may further include operations, features, means, or instructions for translating the optically transmissive substrate relative to the first output and the second output of the optic such that the optically transmissive substrate may be positioned at a constant distance from the optic when the first output and the second output modifies the optically transmissive substrate during the single modification pass.

In some examples of the method 500 and the apparatus described herein, modifying the optically transmissive substrate to the first depth comprises fully perforating the optically transmissive substrate through a full depth of the optically transmissive substrate. In some examples of the method 500 and the apparatus described herein, modifying the optically transmissive substrate to the second depth comprises partially perforating the optically transmissive substrate through less than the full depth of the optically transmissive substrate.

Figure 6:
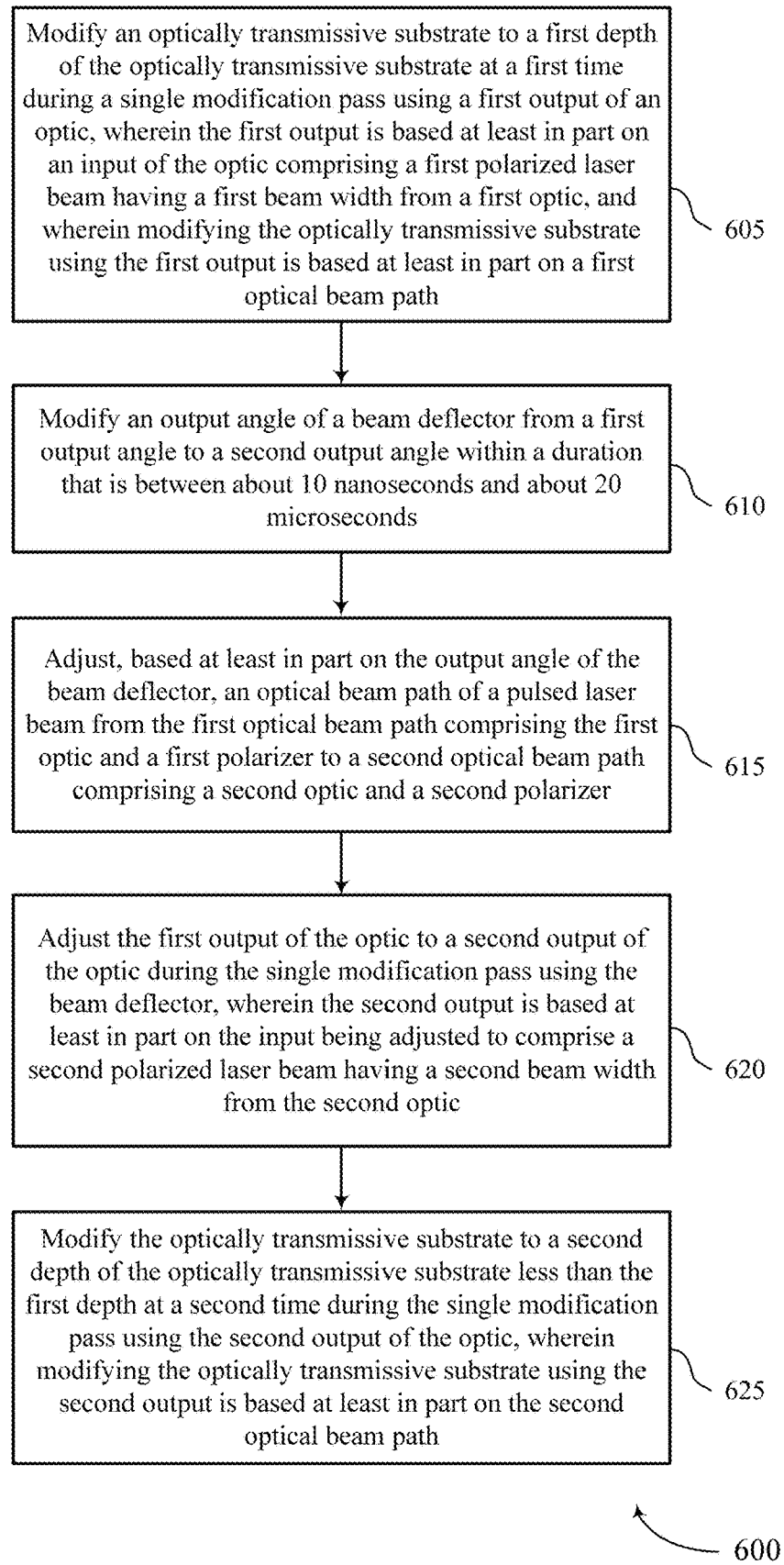

FIG. 6 shows a flowchart illustrating a method 600 that supports real-time modification of line focus intensity distribution in accordance with aspects of the present disclosure. The operations of the method 600 may be implemented by a device or its components as described herein. For example, the operations of the method 600 may be performed by an optical device including a laser cutting optic, as described with reference to FIGS. 1 through 4. In some examples, a device may execute a set of instructions to control the functional elements of the device to perform the described functions. Additionally or alternatively, the device may perform aspects of the described functions using special-purpose hardware.

At 605, the method may include modifying (e.g., perforating, ablating, damaging) an optically transmissive substrate to a first depth of the optically transmissive substrate at a first time during a single modification pass using a first output of an optic, wherein the first output is based at least in part on an input of the optic comprising a first polarized laser beam having a first beam width from a first optic. In some examples, modifying the optically transmissive substrate using the first output is based at least in part on a first optical beam path. The operations of 605 may be performed in accordance with examples as disclosed herein.

At 610, the method may include modifying an output angle of a beam deflector from a first output angle to a second output angle within a duration that is between about 10 nanoseconds and about 20 microseconds. The operations of 610 may be performed in accordance with examples as disclosed herein.

At 615, the method may include adjusting (e.g., changing, modifying), based at least in part on the output angle of the beam deflector, an optical beam path of a pulsed laser beam from the first optical beam path comprising the first optic and a first polarizer to a second optical beam path comprising a second optic and a second polarizer. The operations of 615 may be performed in accordance with examples as disclosed herein.

At 620, the method may include adjusting (e.g., changing, modifying) the first output of the optic to a second output of the optic during the single modification pass using the beam deflector, wherein the second output is based at least in part on the input being adjusted to comprise a second polarized laser beam having a second beam width from the second optic. The operations of 620 may be performed in accordance with examples as disclosed herein.

At 625, the method may include modifying (e.g., perforating, ablating, damaging) the optically transmissive substrate to a second depth of the optically transmissive substrate less than the first depth at a second time during the single modification pass using the second output of the optic, wherein modifying the optically transmissive substrate using the second output is based at least in part on the second optical beam path. The operations of 625 may be performed in accordance with examples as disclosed herein.

Figure 7:
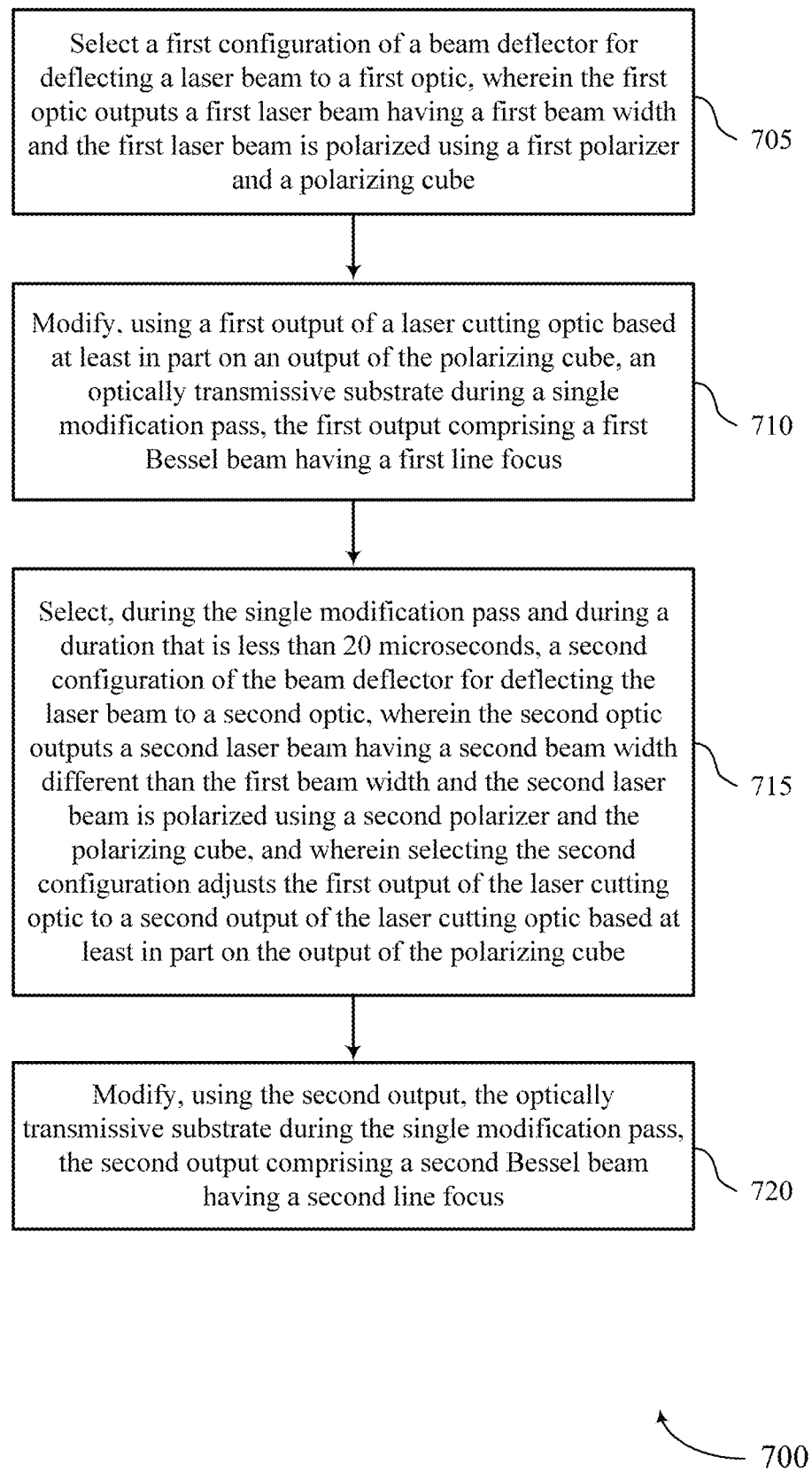

FIG. 7 shows a flowchart illustrating a method 700 that supports real-time modification of line focus intensity distribution in accordance with aspects of the present disclosure. The operations of the method 700 may be implemented by a device or its components as described herein. For example, the operations of the method 700 may be performed by an optical device including a laser cutting optic, as described with reference to FIGS. 1 through 4. In some examples, a device may execute a set of instructions to control the functional elements of the device to perform the described functions. Additionally or alternatively, the device may perform aspects of the described functions using special-purpose hardware.

At 705, the method may include selecting a first configuration of a beam deflector for deflecting a laser beam to a first optic, wherein the first optic outputs a first laser beam having a first beam width and the first laser beam is polarized using a first polarizer and a polarizing cube. The operations of 705 may be performed in accordance with examples as disclosed herein.

At 710, the method may include modifying (e.g., perforating), using a first output of a laser cutting optic based at least in part on an output of the polarizing cube, an optically transmissive substrate during a single modification pass (e.g., perforation pass), the first output comprising a first beam having a first line focus. The operations of 710 may be performed in accordance with examples as disclosed herein.

At 715, the method may include selecting, during the single modification pass and during a duration that is less than 20 μs (e.g., 5 μs, 20 ns, 10 ns), a second configuration of the beam deflector for deflecting the laser beam to a second optic, wherein the second optic outputs a second laser beam having a second beam width different than the first beam width and the second laser beam is polarized using a second polarizer and the polarizing cube, and wherein selecting the second configuration adjusts (e.g., changes, modifies) the first output of the laser cutting optic to a second output of the laser cutting optic based at least in part on the output of the polarizing cube. The operations of 715 may be performed in accordance with examples as disclosed herein.

At 720, the method may include modifying (e.g., perforating), using the second output, the optically transmissive substrate during the single modification pass, the second output comprising a second beam having a second line focus. The operations of 720 may be performed in accordance with examples as disclosed herein.

In some examples, an apparatus as described herein may perform a method or methods, such as the method 700. The apparatus may include, features, circuitry, logic, means, or instructions (e.g., a non-transitory computer-readable medium storing instructions executable by a processor) for selecting a first configuration of a beam deflector for deflecting a laser beam to a first optic, wherein the first optic outputs a first laser beam having a first beam width and the first laser beam is polarized using a first polarizer and a polarizing cube, modifying, using a first output of a laser cutting optic based at least in part on an output of the polarizing cube, an optically transmissive substrate during a single modification pass, the first output comprising a first beam having a first line focus, selecting, during the single modification pass and during a duration that is less than 20 nanoseconds, a second configuration of the beam deflector for deflecting the laser beam to a second optic, wherein the second optic outputs a second laser beam having a second beam width different than the first beam width and the second laser beam is polarized using a second polarizer and the polarizing cube, and wherein selecting the second configuration modifies the first output of the laser cutting optic to a second output of the laser cutting optic based at least in part on the output of the polarizing cube, and modifying, using the second output, the optically transmissive substrate during the single perforation pass, the second output comprising a second beam having a second line focus.

A modified substrate is described. For example, the modified substrate may be a substrate that results from one or more of method 500, method 600, or method 700. In some examples, the modified substrate may be modified (e.g., perforated, ablated, damaged) by a device as described herein. The modified substrate may include a first section at a first end of the modified substrate that has been modified to a first depth of the modified substrate at a first time during a single modification pass using a first beam having a first line focus configuration, a second section of the modified substrate that has been modified to a second depth of the modified substrate less than the first depth at a second time after the first time during the single modification pass using a second beam having a second line focus configuration, and a third section at a second end of the modified substrate that has been modified to the first depth of the modified substrate at a third time after the second time during the single modification pass using the first beam having the first line focus configuration.

In some examples of the modified substrate, the modified substrate comprises a perforated substrate, wherein at least the first section at the first end and the third section at the second end may be perforated through a full depth of the perforated substrate, and at least the second section of the perforated substrate may be perforated through less than the full depth of the perforated substrate.

In some examples of the modified substrate, a first boundary between the first section and the second section of the perforated substrate excludes one or more shadowing effects based at least in part on the second beam modifying the second section at the second time after the first time during the single modification pass, and a second boundary between the second section and the third section of the modified substrate excludes one or more shadowing effects based at least in part on the first beam modifying the second end at the third time after the second time during the single modification pass.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the term "about" means that the modified characteristic (e.g., a verb or adjective modified by the term substantially) or a related aspect (e.g., related action or function), need not be absolute but is close enough to achieve the advantages of the characteristic or related aspect (e.g., related action or function).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   modifying an optically transmissive glass substrate to a first depth of the optically transmissive glass substrate at a first time during a single modification pass using a first output of an optic, wherein the first output is based at least in part on an input of the optic comprising a first polarized laser beam having a first beam width from a first optic;
   adjusting the first output of the optic to a second output of the optic during the single modification pass using a beam deflector, wherein the second output is based at least in part on the input being adjusted to comprise a second polarized laser beam having a second beam width from a second optic; and
   modifying the optically transmissive glass substrate to a second depth of the optically transmissive glass substrate less than the first depth at a second time during the single modification pass using the second output of the optic,
   wherein:
   modifying the optically transmissive glass substrate to the first depth comprises fully perforating the optically transmissive glass substrate through a full depth of the optically transmissive glass substrate, and
   modifying the optically transmissive glass substrate to the second depth comprises partially perforating the optically transmissive glass substrate through less than the full depth of the optically transmissive glass substrate.

2. The method of claim 1, wherein adjusting the first output of the optic comprises:
   adjusting, based at least in part on an output angle of the beam deflector, an optical beam path of a pulsed laser beam from a first optical beam path comprising the first optic and a first polarizer to a second optical beam path comprising the second optic and a second polarizer, wherein modifying the optically transmissive glass substrate using the first output is based at least in part on the first optical beam path and modifying the optically transmissive glass substrate using the second output is based at least in part on the second optical beam path.

3. The method of claim 2, wherein the first output comprises a first beam having a first focal line length based at least in part on the first beam width and the second output comprises a second beam having a second focal line length different than the first focal line length based at least in part on the second beam width.

4. The method of claim 2, further comprising:
   modifying the output angle of the beam deflector from a first output angle to a second output angle within a duration that is between about 10 nanoseconds and about 20 microseconds.

5. The method of claim 1, further comprising:
   translating the optically transmissive glass substrate relative to the first output and the second output of the optic such that the optically transmissive glass substrate is positioned at a constant distance from the optic when the first output and the second output modifies the optically transmissive glass substrate during the single modification pass.

6. The method of claim 1, wherein the second time is after the first time.

7. The method of claim 1, wherein adjusting the first output of the optic to the second output of the optic using the beam deflector comprises deflecting the first polarized laser beam from a first direction to a second direction such that the first direction is different from the second direction.

8. The method of claim 7, further comprising deflecting the first polarized laser beam from the first direction to the second direction within about 20 nanoseconds or less.

9. The method of claim 1, wherein adjusting the first output of the optic to the second output of the optic using the beam deflector comprises deflecting the first polarized laser beam to a first direction and to a second direction simultaneously, such that the first direction is different from the second direction.

10. The method of claim 1, wherein the second beam width is different from the first beam width.

11. The method of claim 1, wherein adjusting the first output of the optic to the second output of the optic comprises changing a profile of the first polarized laser beam such that the first polarized laser beam comprises a different profile from the second polarized laser beam.

12. The method of claim 1, wherein adjusting the first output of the optic to the second output of the optic comprises changing a position of the first polarized laser beam relative to the optically transmissive glass substrate such that the first polarized laser beam comprises a different position from the second polarized laser beam relative to the optically transmissive glass substrate.

* * * * *